United States Patent Office 3,428,708
Patented Feb. 18, 1969

3,428,708
N,N-DIALKYLGLYCIDYLAMINE-CAPPED POLYOLS
William C. Kuryla, St. Albans, W. Va., assignor to Union Carbide Corporation, a corporation of New York
No Drawing. Filed July 27, 1966, Ser. No. 568,147
U.S. Cl. 260—830
Int. Cl. C08g 30/08, 22/14
20 Claims

ABSTRACT OF THE DISCLOSURE

N,N-dialkylglycidylamine-capped polyols are prepared as novel compositions of matter by the base catalyzed reaction of a N,N-dialkylgylcidylamine with a hydroxyl terminated polyol. These compositions catalyze and enter into a polyurethane reaction and also react with an epoxide polymer.

---

The present invention relates to the preparation of amine capped polyols and their reaction with organic compounds having reactive groups and compounds obtained thereby. Specifically, the present invention relates to the chain termination of polyols well known in the art with glycidyl amine compounds of the general formula

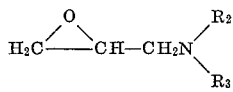

as well as the compounds obtained thereby and the reaction products thereof with isocyanate and vicinal epoxy compounds where $R_2$ and $R_3$ are alkyl hydrocarbon moieties of from 1–10 carbon atoms and the amine nitrogen is in position $\beta$ to a terminal hydroxyl on the polyol chain after reaction.

It is known in the prior art that some hydroxyl compounds or polyols may be reacted with the organic isocyanates or the vicinal epoxides both of which are well known in the art. Not all compounds containing hydroxyl groups react with isocyanates or epoxides at the same rate. Generally speaking, in such reactions it is advantageous to use hydroxyl compounds that have relatively high reaction rates without excessive exotherms in order to facilitate the production of subsequently derived compounds at faster rates and consequently reduced cost.

In the production of polyurethane foams, polyisocyanates are reacted with polyols and minor amounts of water to form a polymeric compound while simultaneously generating $CO_2$ in situ as a blowing agent. Other urethane polymers may be formed in the same way except water is not added. High molecular weight polyols are slow to react in the formation of the urethane, and consequently a catalyst is needed to accelerate the reaction. High molecular weight polyols in spite of this disadvantage, are none the less employed in the manufacture of polyurethanes because of other desirable properties obtained through their use.

It is therefore an object of the present invention to overcome these and other disadvantages encountered in the prior art; more specifically, it is an object of the present invention to provide a method and a composition for the production of hydroxyl compounds that will react with organic compounds which have a reactive oxygen such as the isocyanates and epoxides. It is a further object of this invention to provide a relatively high molecular weight polyol capped with an organic amine which will react with isocyanates and epoxides as well as catalyze the reaction of unmodified high molecular weight polyols with isocyanates and epoxides. It is a further object of this invention to provide an amine-capped polyol capable of reaction with an epoxide compound, preferably a vicinal epoxide.

These and other objects have been achieved by the present invention by which polyols are synthesized that contain a dialkylamino group substantially in a position $\beta$ to the terminal hydroxyl moiety of a polyols chain. The reaction may be illustrated by the following.

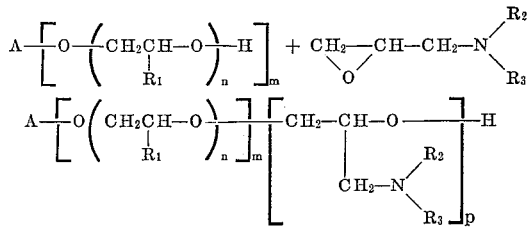

where A is a "starter" molecule having 1 or more, preferably 2 or more reactive hydroxyl hydrogens, $n=10–30$, $p=1–10$ and $m$ is a number equal to the functionality of A, or from one to the functionality of A. In the above formula $R_1$, $R_2$ and $R_3$ are equal to 1–10 carbon atom, organo substituents e.g., alkyl hydrocarbon substituents; methyl, ethyl, propyl, isopropyl butyl and isobutyl being preferred or mixtures thereof.

The moiety

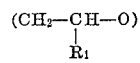

comprises a chain of alkylene oxide ethers the repeating units of which contain preferably from 2–6 carbon atoms, isomers thereof and mixtures thereof. The alkylene oxide in the above formula may for example comprise polypropylene oxide of a molecular weight from 2000–6000 or propylene oxide-ethylene oxide alternating units.

The "starter" molecule "A" represents a polyol residue including those obtained by the reaction of alkylene oxide or mixtures of alkylene oxides or alkylene oxide ethers therewith. Suitable polyols comprise glycerol, trimethylol propane, 1,2,6-hexanetriol; trimethylol ethane; 1,1,5,5-tetrakis(4-hydroxyphenyl)pentane; tripentaerythritol, dipentaerythritol, pyrogallol, pentaerythritol, D-manitol, sorbitol, ethylene glycol, propylene glycol, 1,1,1-trimethylol ethane 2 - methyl - 2-ethyl-1,3-propanediol, 1,1,1-trimethylolpropane trimethylene glycol, 1,3-butanediol, 1,4-butanediol, 1,3 - butanediol, 2,3 - butanediol, 1,2,4-trihydroxybutane 1,4-butenediol 1,4-butynediol, 2,4-pentanediol, 1,5-pentanediol, 1,6-hexanediol, 2,5-hexanediol, 2-methyl-1,3-pentanediol, 2-methyl-2,4-pentanediol, 2,3-dimethyl - 2,3-butanediol(pinacol), 2,4-heptanediol, 2,2-diethyl-1,3-propanediol, 2-ethyl-1,3-hexanediol, 2-ethyl-2-n-butyl-1,3-propanediol, diethylene glycol, triethylene glycol, tetraethylene glycol and dipropylene glycol.

Starter molecule "A" broadly includes other polyethers which include the linear and branched chain polyethers which have a plurality of acyclic ether oxygens and contain at least two hydroxyl groups. The polyethers are substantially free from functional groups other than hydroxyl groups and normally have molecular weights, based on their hydroxyl value, ranging from about 250 to about 5000.

Illustrative polyethers include the polyoxyalkylene polyols containing one or more chains of connected oxyalkylene groups which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide, and the polyoxybutylene glycols and copolymers such as polyoxyethyleneoxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acyclic and alicyclic polyols which can be reacted with ethylene oxide, propylene oxide, butylene oxide or mixtures thereof to provide useful polyethers include glycerol, 1,1,1-trimethylolpropane, 1,2,6-hexanetriol, pentaerythritol, sorbitol, glycosides, such as methyl, ethyl, propyl, butyl and 2-ethylhexyl arabinoside, xyloside, fructoside, glycoside, rhammoside, etc. and polyethers prepared by the reaction of alkylene oxides with sucrose, for example:

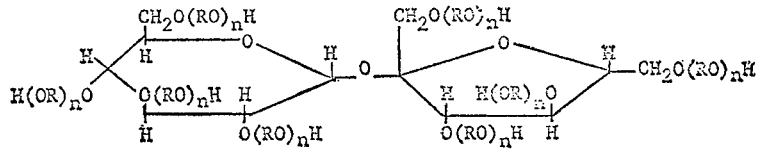

wherein R is ethylene, propylene, butylene, or mixtures thereof, and $n$ is an integer such that the average molecular weight of the polyether is 250 and higher.

Further included are polyethers prepared by reacting a 1,2-alkylene oxide such as ethylene oxide, propylene oxide, butylene oxide or mixtures thereof with mononuclear polyhydroxybenzenes such as resorcinol, pyrogallol, phloroglucinol, hydroquinone, 4,6 - di - t - butylcatechol, catechol, orcinol, methylphoroglucinol, 2,5,6-trimethylresorcinol, 4-ethyl-5,6-dimethylresorcinol, n-hexylresorcinol, 4-chloro-5-methylresorcinol, and the like; polyethers prepared by reacting 1,2-alkylene oxides or mixtures thereof with fused ring systems such as 3-hydroxy-2-naphthol, 6,7-dihydroxy-1-naphthol, 2-hydroxy-1-naphthol, 2,5-dihydroxy-1-naphthol, 9,10-dihydroxyanthracene, 2,3-dihydroxyphenanthrene, etc.

Other polyethers which can be employed are those obtained by reacting hydroxybenzenes such as the various di-, tri- and tetraphenylol compounds in which two to four hydroxy benzene groups are attached by means of single bonds or by an aliphatic hydrocarbon radical containing one to twelve carbon atoms. The term "polynuclear" as distinguished from "mononuclear" is used to designate at least two benzene nuclei in a compound.

Exemplary diphenylol compounds include 2,2-bis(p-hydroxyphenyl)propane; bis(p-hydroxyphenyl)methane and the various diphenols and diphenylol methanes disclosed in U.S. Patents 2,506,486 and 2,744,882, respectively.

Exemplary triphenylol compounds which can be employed include the alpha, alpha, omega-tris(hydroxyphenyl)alkanes such 1,1,2-tris(hydroxyphenyl)ethanes;
1,1,3-tris(hydroxyphenyl)propanes;
1,1,3-tris(hydroxy-3-methylphenyl)propanes;
1,1,3,-tris(dihydroxy-3-methylphenyl)propanes;
1,1,3-tris(hydroxy-2,4-dimethylphenyl)propane;
1,1,3-tris(hydroxy-2,5-dimethylphenyl)propanes;
1,1,3-tris(hydroxy-2,6-dimethylphenyl)propane;
1,1,4-tris(hydroxyphenyl)butanes;
1,1,4-tris(hydroxyphenyl)-2-ethylbutanes;
1,1,4-tris(dihydroxyphenyl)butanes;
1,1,5-tris(hydroxyphenyl)-3-methylpentanes;
1,1,8-tris(hydroxyphenyl)octanes;
1,1,10-tris(hydroxyphenyl)decanes;
and the like.

Tetraphenylol compounds which can be reacted with 1,2-alkylene oxides include the alpha, alpha, omega, omega-tetrakis(hydroxyphenyl)alkanes such as 1,1,2,2-tetrakis(hydroxyphenyl)ethanes;
1,1,3,3-tetrakis(hydroxy-3-methylphenyl)propanes;
1,1,3,3-tetrakis(dihydroxy-3-methylphenyl)propanes;
1,1,4,4-tetrakis(hydroxyphenyl)butanes;
1,1,4,4-tetrakis(hydroxyphenyl)-2-ethylbutanes;
1,1,5,5-tetrakis(hydroxyphenyl)pentanes;
1,1,5,5-tetrakis(hydroxyphenyl)-3-methylpentanes;
1,1,5,5-tetrakis(dihydroxyphenyl)pentanes;
1,1,8,8-tetrakis(hydroxy-3-butylphenyl)octanes;
1,1,8,8-tetrakis(dihydroxy-3-butylphenyl)octanes;
1,1,8,8-tetrakis(hydroxy-2,5-dimethylphenyl)octanes;
1,1,10,10-tetrakis(hydroxyphenyl)decanes;

and the corresponding compounds which contain substituent groups in the hydrocarbon chain such as 1,1,6,6-tetrakis(hydroxyphenyl)-2-hydroxyhexanes;
1,1,6,6-tetrakis(hydroxyphenyl)-2-hydroxy-5-methylhexanes;
1,1,7,7-tetrakis(hydroxyphenyl)-3-hydroxyheptanes;
and the like.

Other particularly useful polyethers which can be employed are the ethylene oxide, propylene oxide, and butylene oxide adducts of phenolic and resole type resinous materials.

Novolaks are mixtures of polynuclear compounds of the diphenylmethane type of structure, such as 4,4'-dihydroxydiphenylmethane and 2,4'-dihydroxydiphenylmethane formed by the Baeyer reaction of phenol and formaldehyde. In a typical synthesis, novolaks are prepared by condensing one mole of phenolic compound, such as phenol or cresol, with 0.8 mole of an aldehyde, such as formaldehyde or furfural, under acid conditions at a temperature around 160° C. to 170° C. The polynuclear products frequently contain 4 to 8 units and may contain 12 or more units. Novolaks, as such, are non-curable, thermoplastic resins.

A specific embodiment of the present invention comprises the "capping" of polyoxypropylene triols with N,N-dialkylglycidyl amines such as N,N-dimethylglycidylamine (N,N-dimethyl - 2,3 - epoxypropylamine) and N,N-diethylglycidylamine (N,N-diethyl-2,3-epoxypropylamine). The polyoxypropylene triols may comprise a 3000 average molecular weight triol, a 5000 average molecular weight triol and a 6000 average molecular weight triol obtained by the reaction of propylene oxide with glycerol.

A variety of isocyanates may be employed for reaction with the polyethers above described to provide urethane foams which can be stabilized according to the invention. Preferred isocyanates are polyisocyanates and polyisothiocyanates of the general formula:

$$R(NCG)_x$$

wherein G is oxygen or sulfur, $x$ is an integer of two or more and R is an alkylene, substituted alkylene, arylene or substituted arylene radical, a hydrocarbon or substituted hydrocarbon containing one or more aryl-NCG bonds and one or more alkyl-NCG bond. R can also include radicals such as —RZR— where Z may be a divalent moiety such as —O—, —O—R—O, —CO—, —CO$_2$—, —S—, —S—R—S—, —SO$_2$—, etc. Examples of such compounds include hexamethylene diisocyanate, 1,8-diisocyanato-p-methane, xylylene diisocyanates $$(OCNCH_2CH_2CH_2OCH_2)_2$$

1-methyl-2,4-diisocyanatocyclohexane, phenylene diisocyanates, tolylene diisocyanates, chlorophenylene diisocyanates, diphenylmethane-4,4'-diisocyanate, naphthalene-1,5 - diisocyanate, triphenylmethane-4,4',4''-triisocyanate, xylene-α,α'-diisothiocyanate, and isopropylbenzene-α,4-diisocyanate.

Further included are dimers and trimers of isocyanates and diisocyanates and polymeric diisocyanates of the general formulae:

$$(RNCG)_x$$

and $$[R(NCG)_x]_y$$

in which $x$ and $y$ are two or more, as well as compounds of the general formula:

$$M(NCG)_x$$

in which $x$ is two or more and M is a monofunctional or polyfunctional atom or group. Examples of this type include ethylphosphonic diisocyanate, $$C_2H_5P(O)(NCO)_2$$

phenylphosphonic diisocyanate, $C_6H_5P(NCO)_2$; compounds containing a $\equiv Si-NCG$ group, isocyanates derived from sulfonamides $R(SO_2NCO)_4$, and the like. The aromatic polyisocyanates are preferred particularly the arylene diisocyanates such as 2,4- and 2,6-tolylene diisocyanate.

The preparation of polyether-based urethane foams can be carried out by the one-shot, semiprepolymer or prepolymer techniques, all of which are well known.

The amount of isocyanate employed will depend upon the density of the urethane foam and the amount of cross linking desired. In general the total —NCO equivalent to total active hydrogen equivalent should be such as to provide a ratio of 0.8 to 1.2 equivalents of —NCO per equivalent of active hydrogen, and preferably a ratio of about 1.0 to 1.1 equivalents of —NCO per equivalent of active hydrogen.

Specifically the isocyanates employed in the present invention include tolylene 2,4 and 2,6-diisocyanate 4,4-methylenediortho-
  tolyisocyanate,
2,4,4'-triisocyanatodiphenyl-ether,
toluene-2,3,6-triisocyanate,
1-methoxy-2,4,6-triisocyanato-benzene,
m-phenylenediisocyanate,
4-chloro-m-phenylenediisocyanate,
4,4'-biphenyldiisocyanate,
1,5-naphthalenediisocyanate,
1,4-tetramethylenediisocyanate,
1,6-hexamethylenediisocyanate,
1,10-decamethylenediisocyanate,
1,4-cyclohexanediisocyanate,
1,2-ethylenediisocyanate,
diphenylmethane p,p'-diisocyanate,
bis(p-isocyanatocyclohexyl)-methane,
stilbene diisocyanate,
dixylyl-methane diisocyanate,
2,2-bis(4-isocyanatophenyl)propane,
di-phenylmethane tetraisocyanates,
trimethylbenzene triisocyanates,
phenyltolylmethane triisocyanates,
ditolymethane triisocyanates,
triphenylmethane triisocyanates,
3,3'-dimethyldiphenylene-4,4'-diisocyanate,
3,3'-dimethoxydiphenylene-4,4'-diisocyanate,
diphenyl triisocyanate and isomers of bis(p,p'-isocyanatophenyl)-cyclohexane and any combination thereof. The monoisocyanates of the above compounds, however may also be used but are not preferred.

The epoxides suitable for the present invention comprise bisphenol A and bisphenol F epichlorohydrin reaction products well known in the art as well as the peracetic acid oxidation products all of which are also well known.

The amine is added to the polyol in such a fashion in amounts stoichiometric in excess of or less than the stoichiometric amount with respect to the polyol hydroxyl groups present.

The following catalysts may be employed in promoting the reaction of the glycidyl amine with the polyol: alkali metal hydroxides, alkali metal alcoholates, alkali metals: Li, Na, K, Cs, Rb.

Furthermore such reaction may be conducted either neat or in the presence of an inert solvent such as toluene, xylene, dimethyl sulfoxide, tetramethylene sulfoxide, dimethyl formamide.

The reaction of the amine capped polyols with isocyanate or epoxide compounds may be carried out at temperatures from 20 to 200° C., and over periods of time to effect either a partial or complete reaction of the components.

In preparing polyurethane foams encompassed within the invention, the amino capped polyol is reacted with an organic polyisocyanate.

The amount of organic polyisocyanate employed is dependent in part, upon such factors as the nature of the reactants, the end-use intended for the foamed product, and the like. In general, however, the total isocyanate equivalent to total reactive hydrogen equivalent (i.e., total equivalent of alcoholic hydroxyl plus water, if water is employed in the reaction mixture) is ordinarily such as to provide enough isocyanate equivalents to react with all reactive hydrogen equivalents present. Preferably the ratio of isocyanate equivalents to reactive hydrogen equivalents is about 1.0 to 1.1 —NCO equivalents per reactive hydrogen equivalent.

The foaming operation is preferably effected by the one-shot technique, although the quasi-prepolymer technique can also be employed if desired.

Foaming can be accomplished by employing a small amount of water in the reaction mixture (for example, from about 0.5 to about 5 weight percent of water, based upon total weight of the reaction mixture), or through the use of blowing agents which are vaporized by the exotherm of the reaction, or by a combination of the two methods. All of these methods are known in the art. Illustrative blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutene, octafluorocyclobutane, and the like. Another useful class of blowing agents includes thermally-unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product. In general, however, it may be stated that for 100 grams of reaction mixture containing an average NCO/OH ratio of about 1:1, about 0.005 to 0.3 mole of gas are used to provide densities ranging from 30 to 1 pound per cubic fot respectively. The exact amount of blowing agent used can be determined by routine laboratory experimentation.

Catalysts are ordinarily employed in the reaction mixture for accelerating the isocyanate-reaction hydrogen reaction. Such catalysts include a wide variety of compounds such as, for example members of the groups consisting of:

(a) Salts of organic carboxylic acids with a variety of metals such as alkali metals, alkaline earth metals, Al, Sn, Pb, Sb, Mn, Co, Ni, and Cu, some of the more important of such salts being, for instance, stannous octoate, stannous acetate, stannous oleate, lead octoate, metallic driers such as manganese and cobalt naphthenate, sodium acetate, potassium laurate, calcium hexanoate, and the like;

(b) Organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, for example, dibutyltin dilaurate, dibutyltin diacetate, dibutyltin maleate, dilauryltin diacetate, dioctyltin diacetate, dibutyltin bis(4 - dimethylaminobenzoate), dibutyl bis(6-methylaminocaproate), and the like. Also, trialkyltin hydroxides, dialkyltin dialkoxides, and dialkyltin dichlorides can be used.

(c) Other classes of compounds which can be used include tertiary phosphines, alkali and alkaline earth metal hydroxides, alkoxides, and phenoxides, acidic metal salts of strong acids, chelates of various metals, alcoholates and phenolates of various metals, and the like.

The catalysts are employed in small amounts, for example, from about 0.001 weight percent to about 5 weight percent, based on weight of the reaction mixture.

It is also within the scope of the invention to employ small amounts, e.g., about 0.001 percent to 5.0 percent by weight, based on the total reaction mixture, of an emulsifying agent such as a polysiloxane-polyoxyalkylene block copolymer having from about 10 to 80 percent by weight of siloxane polymer and from 90 to 20 percent by weight of alkylene oxide polymer, such as the block copolymers described in U.S. Patents 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. The non-hydrolyzable copolymers generally contain from 5 to 95 weight percent, and preferably from 5 to 50 weight percent, of polysiloxane polymer with the remainder being polyoxyalkylene polymer. The non-hydrolyzable copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Silicone L520 is employed in the examples of the present invention and comprises a polysiloxane-polyoxyalkylene block copolymer.

It is desirable that the polyol employed have a hydroxyl number in the range of from about 25 to about 1000, preferably from about 30 to about 500, and most preferably from about 35 to about 90. The hydroxyl number of a polyol is defined as being the number of milligrams of potassium hydroxide necessary to fully hydrolyze the acetylated derivative of 1 gram of polyol (ordinarily phthalic anhydride is employed for the acetylation). The hydroxyl number can also be calculated from the equation $$OH = \frac{1000 \times 56.1 \times f}{M.W.}$$

OH = hydroxyl number of the polyol,
$f$ = functionality of the polyol, that is, average number of hydroxyl groups per molecule,
M.W. = molecular weight of the polyol.

The following non-limiting examples are included as certain preferred embodiments of the invention.

Example 1.—Amine capped polyol A

Capping a 3000 av. mol. wt. triol with N,N-diethylglycidylamine.—3000 grams (one mole) of a triol designated LG–56 (a 3000 average mol. wt. adduct of 1,2-propylene oxide to glycerol, hydroxyl number of 56, unacidified commercial grade) is added to 15 g. of sodium methylate in a 5 l. flask, equipped with a mechanical stirrer, thermometer, nitrogen inlet, addition funnel, and condenser. Methanol is then removed by vacuum stripping the above mixture at a temperature of 90° C., at a pressure of 2 mm. Hg, and for a period of 2 hours to give 8 g. of collected distillate.

Upon completion of the reaction of sodium methylate and triol LG–56 total of 390 g. (438 ml. of N,N-diethylglycidylamine (3.02 moles) is added to the above charge over a 3 hour time period at a temperature of 110° C.

The product is refined by the addition of 130 g. (4 wt. percent) of synthetic magnesium silicate and heating for 1 hour at 90° C. Ionol (1.6 g., 500 p.p.m.) is then added and the mixture is vacuum stripped for 2 hours at 90° C. (2 mm. Hg) to remove a total of 209 g. of unreacted N,N-diethylglycidylamine. The vacuum stripped mixture is then pressure filtered (60 p.s.i.) to yield the final straw yellow liquid product.

The product analyzes as follows:
Hydroxyl number—47.1.
Brookfield viscosity—530 cps. at 25° C.
Elemental analysis—C, 60.98; H, 10.31; N, 0.71.
Color—Light straw yellow.

Example 2.—Amine capped polyol B

Capping a 3000 av. mol. wt. triol with N,N-diethylglycidylamine using dimethyl sulfoxide as a solvent.—The process of Example 1 is repeated, except 54 g. of sodium methylate are used. A total of 34 g. of distillate (methanol) is collected. Dimethyl sulfoxide (600 g.) is then added with 390 g. (438 ml.) of N,N-diethylglycidylamine and the temperature of the reactants raised slowly over a 4 hr. period to a maximum temperature of 136° C. Concentrated phosphoric acid (85%, 114 g.) is then added to neutralize the base, and the product refined as described in Example 1 to give 465 g. of solvent and unreacted N,N-diethylglycidylamine.

The product analyzes as follows:
Hydroxyl number—36.7.
Brookfield viscosity—850 cps. at 25° C.
Elemental analysis—C, 61.52; H, 9.95; N, 1.35; S, 1.02.
Color—Light yellow.

Example 3.—Amine capped polyol C

Capping a 3000 av. mol. wt. triol with N,N-diethylglycidylamine using potassium hydroxide as the catalyst.—The process of Example 1 is repeated, except 3000 g. (one mole) of an LG–56 triol containing 0.201 wt. percent potassium hydroxide is used in place of the triol of Example 1. N,N-diethylglycidylamine (417 g. 3.23 moles) is charged directly to the "crude" LG–56 and the mixture heated to 135–140° C. for 3.5 hrs. The mixture obtained is substantially the same as described in Example 1, to give a total of 23 g. of distillate.

The product analyzes as follows:
Hydroxyl number—44.6.
Brookfield viscosity—640 cps. at 25° C.
Elemental analysis—C, 62.02; H, 10.95; N, 1.77.
Color—Light yellow.

Example 4.—Amine capped polyol D

Capping a 3000 av. mol. wt. triol with N,N-dimethylglycidylamine.—The process of Example 1 is repeated, except 3000 g. of triol LG–56 which contained 0.21 wt. percent potassium hydroxide is used. N,N-dimethylglycidylamine (303 g. 3.00 moles) is charged directly to the triol and the mixture slowly heated to 135° C. over a 3.5 hr. period.

The product is then refined according to the procedure of Example 1, to yield 70 g. of N,N-dimethylglycidylamine as the distillate. This light yellow liquid is then charged back to a 5-l. Flask and vacuum stripped (2 mm. Hg) at 110° C. for 3 hrs., with a nitrogen sparger, to remove the last traces of N,N-dimethylglycidylamine (traps=6 g.). There is no detectable amine odor of the re-stripped final product.

The product analyzes as follows:
Hydroxyl number—56.0.
Brookfield viscosity—640 cps. at 25° C.
Elemental analysis—C, 61.32; H, 10.86; N, 0.86.
Color—Light yellow.

Example 5.—Amine capped polyol E

Capping a 5000 av. mol. wt. triol with N,N-dimethylglycidylamine.—The process of Example 1 is repeated, except a mixture of 3000 g. (0.60 moles) of triol LG–34 (a 5000 av. mol. wt. adduct of 1,2-propylene oxide to glycerol, hydroxyl number of 34), and 10 g. of sodium methylate is used. A total of 11 g. of methanol distillate is collected after vacuum stripping the mixture. N,N-dimethylglycidylamine (183.5 g. 1.82 moles) is added to the above charge and this mixture is heated slowly to 120° C. over a 1-hr. period. The contents are then allowed to cool slowly to room temperature (overnight), and the light yellow-orange product refined in the manner described in Example 1. A total of 58 g. of distillates is collected.

Re-refining the above liquid product, in an effort to remove the last traces of amine, in the manner described in the preparation of Amine-Capped Polyol D gave an additional 4 g. of distillate in the final product.

The product analyzes as follows:
Hydroxyl number—30.6.
Brookfield viscosity—940 cps. at 25° C.
Elemental analysis—C, 61.37; H, 10.27; N, 0.71.
Color—Light orange-yellow.

Example 6.—Amine capped polyol F

Capping of a 6000 av. mol. wt. triol with N,N-dimethylglycidylamine.—The process of Example 1 is repeated except 960 g. (0.16 moles) of a triol having an average molecular weight of 6000 (made by the base catalyzed addition of 1,2-propylene oxide to glycerol), and 27 g. of sodium methylate are used. A total of 19 g. of methanol distillate is collected after vacuum stripping this mixture. N,N-dimethylglycidylamine (50.5 g., 0.50 moles) is added to the above charge and this mixture heated to a temperature of 120° C. for 4 hours.

The product is refined in the manner described in Example 1, to remove a total of 6 g. of distillate. The refined polyol obtained has no residual amine odor and is therefore not further vacuum stripped as in the previous two examples.

The product analyzes as follows:
Hydroxyl number—28.
Brookfield viscosity—1,240 cps. at 25° C.
Elemental analysis—C, 60.91; H, 9.21; N, 0.99.
Color—Light yellow.

Example 7.—Polyepoxide made from amine capped polyol E and bis-phenol "A" diglycidyl ether To 55.2 g. of polyol E is added 5.10 g. of a diglycidyl ether of bis-phenol "A." These components are mixed to form a homogeneous solution and placed in open aluminum pans in an oven at 55° C. for 60 hours. The resultant product is a jelly-like tacky composition, showing a degree of elasticity.

In the following examples the various physical properties are measured according to standard testing procedures. In these examples Tensile Strength and an Elongation is measured according to ASTM D-1564-59 T, except that a gauge length of one inch is used so that specimens shorter than 5.5 inches may be tested. Indentation Load Deflection (I.L.D.) is measured according to ASTM D-1564 but a specimen 4" x 4" x 1" is employed with an indentor 2.25" in diameter with indentation carried to 90% deflection and the yield point and the one minute hold values at 25%, 65% and 90% deflection also obtained; density is measured according to ASTM D-1564 W on the I.L.D. samples; resiliency is measured by a ball-rebound test method ASTM D-1564-64 T.

Example 8.—Polyurethane foams made from polyols A+B

General foaming procedure.—The polyol, a silicone L-520 surfactant, water, additives (if any), and N,N,N',N' - tetramethyl - 1,3 - butanediamine (T.M.B.D.A.) are mixed using an air-driven stirrer in a 2-liter stainless steel beaker for a period of 55 seconds. A stannous octoate catalyst is then added, and the mixture stirred for an additional 5 seconds. The tolylene diisocyanate (T.D.I.) is added to the stirred mixture and after a 5 to 8 second time period this mass is poured into a cardboard mold, whereupon the mass foamed to its full height (rise time defined as the time from first adding the diisocyanate to the end of bun rise). The foam is then allowed to cure overnight at room temperature before submitting for testing.

Foam formulation:

Polyol _____ 100 g.
T.M.B.D.A. _____ 0.10 g.
Silicone L-520 _____ 2.0 g.
Water _____ 3.5 g.
Stannous Octoate __ 0.30 g.
T.D.I. (80/20) ____ 5 wt. percent excess of stoichiometric amount (44.6 g. for a polyol having a hydroxyl No. of 56).

POLYURETHANE FOAMS

| Example No. | 8A | 8B | 8C |
|---|---|---|---|
| Polyol Composition: | | | |
| Amine Capped Polyol A, percent | 100 | 100 | |
| Amine Capped Polyol B, percent | | | 100 |
| Formulation Additives: (g./100 g. Polyol) | | 10 DMF¹ | 10 DMF¹ |
| Foam Rise Time, Sec | 57 | 52 | 33 |
| Foam Properties: | | | |
| Tensile, p.s.i | 10.9 | 10.5 | 14.1 |
| Elongation, percent | 105 | 143 | 177 |
| Density, lbs./ft.³ | 1.77 | 1.74 | 1.67 |
| ILD 25% | 0.77 | 0.40 | 0.55 |
| (P.s.i.) 65% | 1.50 | 1.06 | 1.53 |
| (P.s.i.) 90% | 5.20 | 5.18 | 4.52 |
| Resiliency, percent | 19.5 | 37.0 | 40.0 |

¹ N,N-Dimethylformamide.

Example 9.—Polyurethane foams made from amine capped polyols C, G, H and I

The polyurethane foams of this example are made according to the process of Example 8.

Polyol identification

Unmodified polyol G.—Comprises a triol made by the base catalyzed addition of 1,2-propylene oxide to glycerol, having an average hydroxyl number of 56, and an average molecular weight of 3000.

Unmodified polyol H.—Comprises a polymer/polyol made by the in situ polymerization of 20 wt. percent acrylonitrile in polyol G (hydroxyl number of 45).

Unmodified polyol I.—Comprises a polyol made by the Baker Caster Oil Company, which is identified as "Brominated Caster Oil" (hydroxyl number of 41.8).

POLYURETHANE FOAMS

| Example No. | 9A | 9B | 9C | 9D | 9E | 9F |
|---|---|---|---|---|---|---|
| Polyol Composition: | | | | | | |
| Amine Capped Polyol C, Percent | 50 | 25 | | 25 | | 50 |
| Unmodified Polyol G, Percent | 50 | 75 | 100 | | | |
| Unmodified Polyol H, Percent | | | | 75 | 100 | |
| Unmodified Polyol I, Percent | | | | | | 50 |
| Formulation Additives: (g./100 g. Polyol) | (¹) | (¹) | (¹) | (¹) | (¹) | (¹) |
| Foam Rise Time, Sec | 48 | 58 | 88 | 60 | 80 | 64 |
| Foam Properties: | | | | | | |
| Tensile, p.s.i | 11.9 | 12.8 | 11.8 | 14.4 | 19.1 | 12.1 |
| Elongation, Percent | 126 | 131 | 118 | 88 | 99 | 98 |
| Density, lbs./ft.³ | 1.61 | 1.65 | 1.62 | 1.68 | 1.58 | 1.42 |
| ILD 25% | 0.60 | 0.62 | 0.86 | 0.75 | 1.32 | 0.55 |
| (P.s.i.) 65% | 1.16 | 1.22 | 1.54 | 1.72 | 2.51 | 1.26 |
| (P.s.i.) 90% | 4.47 | 5.02 | 7.15 | 11.05 | 11.50 | 6.25 |
| Resiliency, Percent | 34 | 45 | 41 | 42 | 34 | 25 |

¹ None.

Example 10.—Polyurethane foams made from amine capped polyol D

The polyurethane foams of this example are made according to the process of Example 8. The unmodified polyol identified polyol identification is the same as Example 9.

POLYURETHANE FOAMS

| Example No. | 10B | 10B | 10C | 10D | 10E | 10F |
|---|---|---|---|---|---|---|
| Polyol Composition: | | | | | | |
| Amine Capped Polyol D, Percent | 100 | 100 | | 75 | 50 | 25 |
| Unmodified Polyol G, Percent | | | 100 | 25 | 50 | 75 |
| Formulation Additives: (g./100 g. Polyol) | None | 10 DMF[1] | None | None | None | None |
| Foam Rise Time, Sec | [2] 25 | [2] 25 | 87 | [2] 33 | [2] 35 | [2] 54 |
| Foam Properties: | | | | | | |
| Tensile, p.s.i. | 10.3 | 9.7 | 12.6 | 12.6 | 9.5 | 10.2 |
| Elongation, Percent | 103 | 110 | 124 | 106 | 90 | 98 |
| Density, lbs./ft.$^3$ | 1.65 | 1.91 | 1.61 | 1.56 | 1.74 | 1.67 |
| ILD 25% | 0.57 | 0.23 | 0.73 | 0.61 | 0.55 | 0.71 |
| (P.s.i.) 65% | 1.08 | 0.69 | 1.41 | 1.17 | 1.15 | 1.37 |
| (P.s.i.) 90% | 4.40 | 1.10 | 6.70 | 4.75 | 4.93 | 5.00 |
| Resiliency, Percent | 30 | 32 | 44 | 29 | 41 | 43 |

[1] N,N-Dimethyl Formamide.
[2] No TMBDA used in formulation.

Example 11.—Polyurethane foams made from amine capped polyol E

The polyurethane foams of this example are made according to the process of Example 8. The unmodified polyol identification is the same as Example 9, except:

Unmodified polyol J.—Comprises a triol made by the base catalyzed addition of 1,2-propylene oxide to glycerol, having an average hydroxyl number of 34, and an average molecular weight of 5000.

POLYURETHANE FOAMS

| Example No. | 11A | 11B | 11C | 11D | 11E | 11F | 11G |
|---|---|---|---|---|---|---|---|
| Polyol Composition: | | | | | | | |
| Amine Capped Polyol E, percent | 100 | 75 | 50 | 25 | 100 | | |
| Unmodified Polyol G, percent | | 25 | 50 | 75 | | 100 | |
| Unmodified Polyol J, percent | | | | | | | 100 |
| Formulation Additives: (g./100 g. Polyol) | None | None | None | None | None[1] | None[1] | None[1] |
| Foam Rise Time, Sec | [2] 33 | [2] 41 | [2] 51 | [2] 63 | [2] 32 | 85 | 126 |
| Foam Properties: | | | | | | | |
| Tensile, p.s.i. | 12.4 | 10.0 | 13.7 | 11.0 | 13.9 | 12.2 | 7.39 |
| Elongation, percent | 152 | 109 | 143 | 111 | 139 | 116 | 111 |
| Density, lbs./ft.$^3$ | 1.70 | 1.67 | 1.76 | 1.68 | 1.73 | 1.58 | 1.69 |
| ILD 25% | 0.68 | 0.68 | 0.66 | 0.67 | 0.65 | 0.81 | 0.49 |
| (P.s.i.) 65% | 1.35 | 1.35 | 1.44 | 1.42 | 1.34 | 1.64 | 1.24 |
| (P.s.i.) 90% | 5.10 | 5.60 | 5.75 | 5.52 | 6.15 | 6.10 | 5.75 |
| Resiliency, percent | 19 | 30 | 36 | 42 | 17 | 43 | 42 |

[1] 10 wt. percent excess T.D.I. used in formulation.
[2] No TMBDA used in formulation.

Example 12.—Polyurethane foams made from amine capped polyol F

The polyurethane foams of this example are made according to the process of Example 8. The unmodified polyol identification is the same as Example 9.

POLYURETHANE FOAMS

| Example No. | 12A | 12B |
|---|---|---|
| Polyol Composition: | | |
| Amine Capped Polyol F, Percent | 100 | |
| Unmodified Polyol G, Percent | | 100 |
| Formulation Additives: (g./100 g. Polyol) | ([1]) | ([1]) |
| Foam Rise Time, Sec | [2] 35 | 112 |
| Foam Properties: | | |
| Tensile, p.s.i. | 6.70 | 11.0 |
| Elongation, Percent | 68 | 123 |
| Density, lbs./ft.$^3$ | 1.84 | 1.79 |
| ILD 25% | 0.58 | 0.60 |
| (P.s.i.) 65% | 1.17 | 1.25 |
| (P.s.i.) 90% | 4.75 | 5.08 |
| Resiliency, Percent | 22 | 45 |

[1] None.
[2] No TMBDA used in formulation.

Thus it has been shown that the amine capped polyols of the present invention may be used to promote the reaction between polyols and polyisocyanates. Furthermore, the amine capped polyols may be used as the sole hydroxyl containing reactant in the manufacture of urethanes from isocyanates. The urethanes thus obtained are foamed and may be used in the manufacture of seat cushions, pillows, mattresses and the like. The reaction of the amine capped polyol with an epoxide as shown in the above examples results in one instance in the production of a tacky polymeric compound which may be used as a pressure sensitive adhesive for the attachment of labels to containers, industrial equipment, packages or other wrapped articles.

Although the invention has been described by reference to certain preferred embodiment to illustrate the best mode of operation, it is not intended that the novel method and composition be limited thereby, but that obvious modifications thereof are intended to be included within the spirit and the broad scope of the following claims.

What is claimed is:
1. A method for the manufacture of an amine capped polyol comprising reacting a glycidyl amine of the formula:

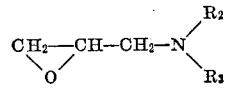

with a polyol of the formula:

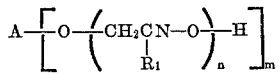

to obtain a compound:

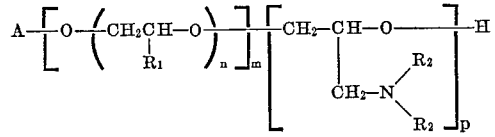

said glycidyl amine occurring as a terminal group in said compound, where $R_1$ is selected from a member of the group consisting of hydrogen, methyl, ethyl, propyl, and butyl moieties, isomers thereof, and mixtures thereof $R_2$ and $R_3$ are selected from at least one member of the group consisting of 1–10 carbon atoms, aliphatic hydrocarbon moieties $n=10$–$30$; $p=1$–$10$, $m$ has a value from one to the functionality of A and A is the residue of a 2–20 carbon atom hydroxyl compound having at least 2 hydroxyl moieties.

2. A composition of matter comprising amine capped polyols of the formula:

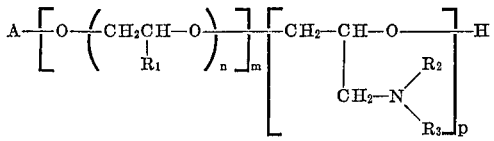

where the glycidyl amine moiety is a terminal group and where $R_1$ is selected from a member of the group consisting of hydrogen, methyl, ethyl, propyl, and butyl moieties, isomers thereof, and mixtures thereof, $R_2$ and $R_3$ are selected from at least one member of the group consisting of 1–10 carbon atoms, aliphatic hydrocarbon moieties, $n=10$–$30$; $p=1$–$10$, $m$ has a value from one to the functionality of A and A is the residue of a 2–20 carbon atom hydroxyl compound having at least 2 hydroxyl moieties.

3. A method of manufacturing a urethane comprising reacting an isocyanate with an amine capped polyol of the formula:

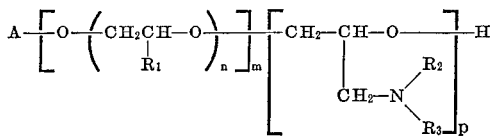

where the glycidal amine moiety is a terminal group and where $R_1$ is selected from a member of the group consisting of hydrogen, methyl, ethyl, propyl, and butyl moieties, isomers thereof, and mixtures thereof, $R_2$ and $R_3$ are selected from at least one member of the group consisting of 1–10 carbon atoms, aliphatic hydrocarbon moieties, $n=10$–$30$; $p=1$–$10$, $m$ has a value from one to the functionality of A and A is the residue of a 2–20 carbon atom hydroxyl compound having at least 2 hydroxyl moieties.

4. A method for manufacturing a polyether comprising reacting an organic 1,2-epoxide compound with an amine capped polyol of the formula:

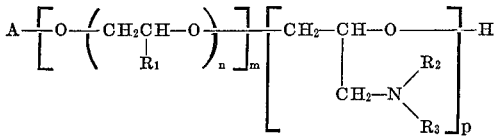

where the glycidyl amine moiety is a terminal group and where $R_1$ is selected from a member of the group consisting of hydrogen, methyl, ethyl, propyl, and butyl moieties, isomers thereof, and mixtures thereof $R_2$ and $R_3$ are selected from at least one member of the group consisting of 1–10 carbon atoms, aliphatic hydrocarbon moieties, $n=10$–$30$; $p=1$–$10$, $m$ has a value from one to the functionality of A and A is the residue of a 2–20 carbon atom hydroxyl compound having at least 2 hydroxyl moieties.

5. A product obtained by the reaction of an isocyanate with an amine capped polyol of the formula

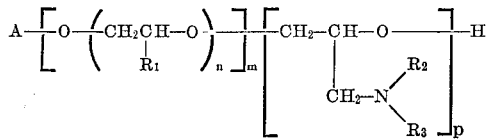

where the glycidyl amine moiety is a terminal group and where $R_1$ is selected from a member of the group consisting of hydrogen, methyl, ethyl, propyl, and butyl moieties, isomers thereof, and mixtures thereof $R_2$ and $R_3$ are selected from at least one member of the group consisting of 1–10 carbon atoms, aliphatic hydrocarbon moieties, $n=10$–$30$; $p=1$–$10$, $m$ has a value from one to the functionality of A and A is the residue of a 2–20 carbon atom hydroxyl compound having at least 2 hydroxyl moieties.

6. A product obtained by the reaction of an organic 1,2-epoxide with an amine capped polyol of the formula

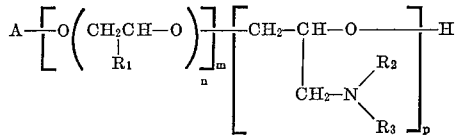

where the glycidyl amine moiety is a terminal group and where $R_1$ is selected from a member of the group consisting of hydrogen, methyl, ethyl, propyl, and butyl moieties, isomers thereof, and mixtures thereof $R_2$ and $R_3$ are selected from at least one member of the group consisting of 1–10 carbon atoms, aliphatic hydrocarbon moieties, $n=10$–$30$; $p=1$–$10$, $m$ has a value from one to the functionality of A and A is the residue of a 2–20 carbon atom hydroxyl compound having at least 2 hydroxyl moieties.

7. A composition of matter comprising a N,N-diloweralkylglycidylamine capped triol adduct of propylene oxide and glycerol where the glycidyl amine moiety is a terminal group.

8. The composition of claim 7 where said adduct has a hydroxyl number from about 25 to about 1000.

9. A composition of matter comprising a N,N-diloweralkylglycidylamine capped triol adduct of propylene oxide and glycerol from about 0.8 to about 1.2 equivalents of a polyisocyanate per active hydrogen of said adduct where said glycidylamine moiety is a terminal group.

10. A composition of matter comprising a N,N-diloweralkylglycidylamine capped triol adduct of propylene oxide and glycerol reacted with an organic epoxide having more than one 1,2-epoxide group where said glycidyl amine is a terminal group.

11. A composition of matter comprising a N,N-diloweralkylglycidylamine capped triol adduct of propylene oxide and glycerol reacted with from about 0.8 to about 1.2 equivalents of tolylene diisocyanate per active hydrogen of said adduct where said glycidyl amine is a terminal group.

12. A composition of matter comprising a N,N-diloweralkylglycidylamine capped triol adduct of propylene oxide and glycerol reacted with a diglycidyl ether of bisphenol A where said glycidyl amine is a terminal group.

13. The composition of claim 9 where said adduct has a hydroxyl number of from about 25 to about 1000.

14. The composition of claim 10 where said adduct has a hydroxyl number of from about 25 to about 1000.

15. The composition of claim 11 where said adduct has a hydroxyl number of from about 25 to about 1000.

16. A composition of claim 12 where said adduct has a hydroxyl number of from about 25 to about 1000.

17. A composition of matter comprising a N,N-diethylglycidyl amine capped triol adduct of 1,2-propylene oxide to glycerol said adduct having an average molecular weight of about 3,000 where the glycidyl amine moiety is a terminal group.

18. A composition of matter comprising a N,N-dimethylglycidyl amine capped triol adduct of 1,2-propylene oxide to glycerol said adduct having an average molecular weight of about 3,000 where the glycidyl amine moiety is a terminal group.

19. The composition of matter comprising a N,N-dimethylglycidylamine capped triol adduct of 1,2-propylene oxide to glycerol said adduct having an average molecular weight of about 5000 where the glycidylamine moiety is a terminal group.

20. A composition of matter comprising a N,N-dimethylglycidylamine capped triol adduct of 1,2-propylene oxide to glycerol said adduct having an average molecular weight of about 6000 where the glycidylamine moiety is a terminal group.

References Cited
UNITED STATES PATENTS

| | | | |
|---|---|---|---|
| 2,498,195 | 2/1950 | Ballard | 252—51.5 |
| 2,731,444 | 1/1956 | Greenlee | 260—47 |
| 3,255,253 | 1/1966 | Kuryla | 260—77.5 |
| 3,256,211 | 6/1966 | Bailey | 260—2 |

MURRAY TILLMAN, *Primary Examiner.*

PAUL LIEBERMAN, *Assistant Examiner.*

U.S. Cl. X.R.

260—2, 2.5, 13, 30.8, 32.6, 33.6, 77.5, 824